(12) United States Patent
Morita et al.

(10) Patent No.: US 9,020,310 B2
(45) Date of Patent: Apr. 28, 2015

(54) OPTICAL WAVEGUIDE AND ARRAYED WAVEGUIDE GRATING

(75) Inventors: Keiichi Morita, Yokohama (JP); Kazumi Shimizu, Yokohama (JP); Kenya Suzuki, Yokohama (JP); Koji Kawashima, Yokohama (JP)

(73) Assignee: NTT Electronics Corporation, Kanagawa (JP)

( * ) Notice: Subject to any disclaimer, the term of this patent is extended or adjusted under 35 U.S.C. 154(b) by 2 days.

(21) Appl. No.: 13/881,135

(22) PCT Filed: Sep. 26, 2011

(86) PCT No.: PCT/JP2011/071812
§ 371 (c)(1),
(2), (4) Date: Apr. 23, 2013

(87) PCT Pub. No.: WO2012/063562
PCT Pub. Date: May 18, 2012

(65) Prior Publication Data
US 2013/0209036 A1    Aug. 15, 2013

(30) Foreign Application Priority Data

Nov. 9, 2010    (JP) .................................. 2010-251219

(51) Int. Cl.
*G02B 6/34*    (2006.01)
*G02B 6/12*    (2006.01)

(52) U.S. Cl.
CPC .............. *G02B 6/34* (2013.01); *G02B 6/12014* (2013.01)

(58) Field of Classification Search
CPC .............. G02B 6/12007; G02B 6/124; G02B 2006/12107; G02B 6/34
USPC .......................................... 385/15, 31, 37, 39
See application file for complete search history.

(56) References Cited

U.S. PATENT DOCUMENTS

| 5,745,618 A | 4/1998 | Li .................................... 385/46 |
| 6,892,004 B1 | 5/2005 | Yu ................................... 385/39 |
| 7,006,729 B2 | 2/2006 | Wang et al. ..................... 385/37 |

FOREIGN PATENT DOCUMENTS

| JP | 2001-159718 A | 6/2001 |
| JP | 2002-062444 A | 2/2002 |
| JP | 2003-014962 A | 1/2003 |

(Continued)

OTHER PUBLICATIONS

International Preliminary Report on Patentability dated May 23, 2013 corresponding to Patent Application No. PCT/JP2011/071812.
Tomoko Nakayama, et al., "Two-dimensional Waveguide Talbot Array Illuminator", Journal of Japan Women's University, Faculty of Science, No. 9, Mar. 25, 2001, pp. 25-34 with English abstract.

(Continued)

*Primary Examiner* — Jennifer Doan
(74) *Attorney, Agent, or Firm* — Ohlandt Greeley Ruggiero & Perle L.L.P.

(57) ABSTRACT

An optical waveguide provided with a slab waveguide, which has a plurality of phase gratings arranged at a distance from each other in a direction substantially parallel to a light propagation direction and diffracting propagated light and a plurality of interference regions arranged alternately to the plurality of phase gratings in the direction substantially parallel to the light propagation direction and interfering the light diffracted by the plurality of phase gratings, and an arrayed waveguide whose end is connected to an end of the slab waveguide at a position of a constructive interference portion of a self-image formed by the plurality of phase gratings as an integrated phase grating.

12 Claims, 19 Drawing Sheets

(56) References Cited

FOREIGN PATENT DOCUMENTS

| JP | 2003-329861 A | 11/2003 |
| JP | 2004333523 | 11/2004 |
| JP | 2005326561 | 11/2005 |
| JP | 2007-279240 A | 10/2007 |
| JP | 2008-293020 A | 12/2008 |

OTHER PUBLICATIONS

W. Klaus, et al., "Theoretical and Experimental Evaluation of Waveguide Talbot Array Illuminators", Proceedings of SPIE—The International Society for Optical Engineering, vol. 3010, Feb. 13, 1997, pp. 38-48.

International Search Report dated Dec. 6, 2011 for corresponding International Patent Application No. PCT/JP2011/071812 with English translation (4 pages).

Japanese Office Action dated Nov. 12, 2013 corresponding to Japanese Application No. 2012-251219; 11 pages.

OPTICAL WAVEGUIDE AND ARRAYED WAVEGUIDE GRATING

BACKGROUND

1. Field of the Disclosure

The present disclosure relates to an optical waveguide and an arrayed waveguide grating, which can reduce insertion loss when light enters from a slab waveguide toward an arrayed waveguide or when the light enters from the arrayed waveguide toward the slab waveguide.

2. Discussion of the Background Art

In a DWDM (Dense Wavelength Division Multiplexing) multiplexer/demultiplexer, an M×N star coupler, a 1×N splitter, and so on, Patent Documents 1 to 6 disclose such a connection structure between a slab waveguide and an arrayed waveguide that when light enters from a slab waveguide toward an arrayed waveguide, the light does not radiate in a clad layer as a radiation mode between the arrayed waveguides adjacent to each other.

In the Patent Documents 1 to 4, a transition region where the refractive index of the waveguide gradually changes from the slab waveguide toward the arrayed waveguide is disposed. In the Patent Document 5, a slope portion is disposed between the slab waveguide and the arrayed waveguide. In the Patent Document 6, a core layer and a plurality of island-shaped regions are arranged in the slab waveguide. The refractive index of the island-shaped region is smaller than the refractive index of the core layer. The island-shaped regions face a clad layer provided between the adjacent arrayed waveguides. The width of the island-shaped region in a direction substantially perpendicular to a light propagation direction becomes narrow from the slab waveguide toward the arrayed waveguide. Light passing through the core layer provided between the island-shaped regions adjacent to each other propagates toward the arrayed waveguide without changing the propagation direction. In light passing through the island-shaped region, the propagation direction is changed by a tapered shape of the island-shaped region, and the light propagates toward the arrayed waveguide. The tapered shape and the position of the island-shaped region are optimized, whereby the light is concentrated on the arrayed waveguide and propagates as a propagation mode.

PRIOR ART DOCUMENTS

Patent Documents

Patent Document 1 U.S. Pat. No. 5,745,618
Patent Document 2 U.S. Pat. No. 7,006,729
Patent Document 3 U.S. Pat. No. 6,892,004
Patent Document 4 Japanese Patent Application Laid-Open No. 2008-293020
Patent Document 5 Japanese Patent Application Laid-Open No. 2001-159718
Patent Document 6 Japanese Patent Application Laid-Open 2003-14962

In the Patent Documents 1 to 4, where the transition region is disposed, the circuit size is large. In the Patent Document 5, since the slope portion is disposed, circuit manufacturing is difficult. In the Patent Document 6, since the tapered shape and the position of the island-shaped region are required to be optimized, the circuit design is difficult.

Thus, in order to solve the above problems, the present disclosure provides an optical waveguide and an arrayed waveguide grating, which does not increase the circuit size, does not make difficult the circuit design and manufacturing, and can reduce insertion loss when light enters from a slab waveguide toward an arrayed waveguide or when the light enters from the arrayed waveguide toward the slab waveguide.

SUMMARY

In order to achieve the above object, a plurality of phase gratings diffracting light propagated in a slab waveguide and a plurality of interference regions where the light diffracted by the plurality of phase gratings is interfered are alternately arranged in a direction substantially parallel to a light propagation direction. An end of an arrayed waveguide is connected to an end of the slab waveguide at a position of a constructive interference portion of a self-image formed by the plurality of phase gratings as an integrated phase grating.

Specifically, an optical waveguide according to the present disclosure includes: a slab waveguide which has a plurality of phase gratings arranged at a distance from each other in a direction substantially parallel to a light propagation direction and diffracting propagated light, and a plurality of interference regions arranged alternately to the plurality of phase gratings in the direction substantially parallel to the light propagation direction and interfering with the light diffracted by the plurality of phase gratings; and an arrayed waveguide having an end connected to an end of the slab waveguide at a position of a constructive interference portion of a self-image formed by the plurality of phase gratings as an integrated phase grating.

According to the above constitution, due to Talbot effect, the self-image of the phase grating is formed according to the wavelength of light and a period of the phase grating formed in the slab waveguide. The end of the arrayed waveguide is disposed at the position of the constructive interference portion of the self-image of the phase grating, whereby when light enters from the slab waveguide toward the arrayed waveguide, the light is concentrated on the arrayed waveguide and propagates as a propagation mode. The size of an optical waveguide is not increased, the design and manufacturing is not made difficult, and insertion loss can be reduced when the light enters from the slab waveguide toward the arrayed waveguide or when the light enters from the arrayed waveguide toward the slab waveguide.

When a plurality of phase gratings is arranged at a distance from each other in a direction substantially parallel to a light propagation direction, light radiation from a low refractive index region of the phase grating, which has a low refractive index can be more reduced than in the case of disposing a single phase grating having a light propagation direction width equal to the total width in the light propagation direction of the plurality of phase gratings. Furthermore, when the phase gratings are arranged at a distance from each other in the direction substantially parallel to the light propagation direction, an additional process such as additional ultraviolet irradiation can be omitted in comparison with a case where a refractive index difference between a region having a high refractive index and a region having a low refractive index of a single phase grating is increased and the light propagation direction width of the single phase grating is reduced.

In the optical waveguide according to the present disclosure, a phase difference given to incident light by the integrated phase grating is approximately 90 degrees.

According to the above constitution, a self-image of the phase grating is clearly formed.

In the optical waveguide according to the present disclosure, a phase difference given to incident light by the integrated phase grating is approximately 180 degrees.

According to the above constitution, the self-image of the phase grating is clearly formed.

In the optical waveguide according to the present disclosure, the plurality of phase gratings includes refractive index difference regions arranged in the slab waveguide at a distance from each other in a direction substantially perpendicular to the light propagation direction and having a refractive index different from the refractive indices of other regions in the slab waveguide.

According to the above constitution, the phase grating can be easily formed in the slab waveguide.

In the optical waveguide according to the present disclosure, the refractive index difference regions adjacent to each other in the direction substantially perpendicular to the light propagation direction are connected by a region having a refractive index equal to the refractive index of the refractive index difference region, and the refractive index difference regions are integrated with each other across the entirety of each phase grating.

According to the above constitution, the phase grating can be easily formed in the slab waveguide.

An arrayed waveguide grating according to the present disclosure includes: one or more first input/output waveguides; the optical waveguide whose end of the slab waveguide on the opposite side of the arrayed waveguide is connected to an end of the first input/output waveguide; a second slab waveguide connected to an end of the arrayed waveguide on the opposite side of the slab waveguide; and one or more second input/output waveguides connected to an end of the second slab waveguide on the opposite side of the arrayed waveguide.

According to the above constitution, the size of the arrayed waveguide grating is not increased, the design and manufacturing is not made difficult, and the insertion loss can be reduced when light enters from the slab waveguide toward the arrayed waveguide or when the light enters from the arrayed waveguide toward the slab waveguide.

The present disclosure can provide an optical waveguide and an arrayed waveguide grating, which does not increase the circuit size, does not make difficult the circuit design and manufacturing, and can reduce insertion loss when light enters from a slab waveguide toward an arrayed waveguide or when the light enters from the arrayed waveguide toward the slab waveguide.

DETAILED DESCRIPTION OF THE PREFERRED EMBODIMENTS

Figure 1:
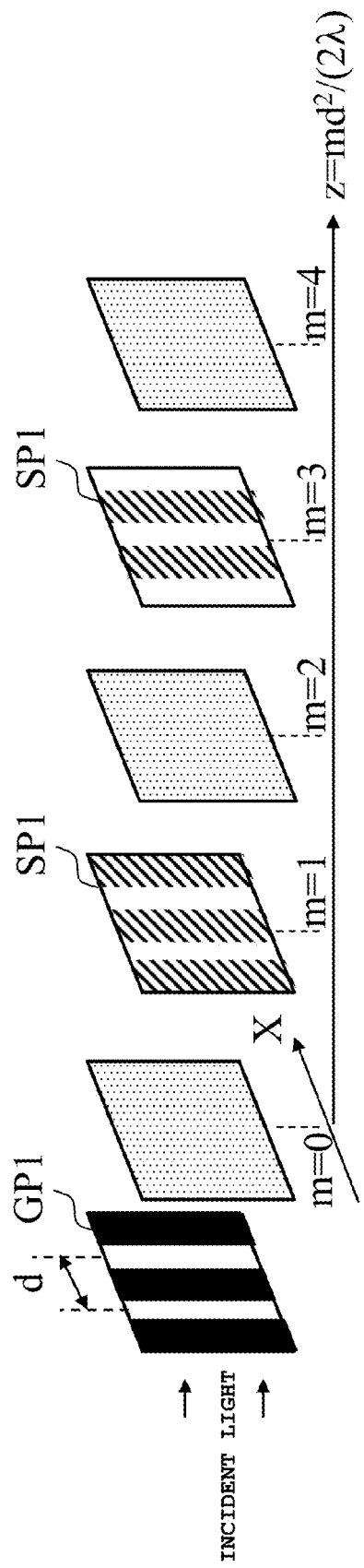
FIG. 1 is a view showing a phenomenon of Talbot effect.

Embodiments of the present disclosure will be described with reference to the accompanying drawings. The embodiments to be described hereinafter are examples of the present disclosure, and the present disclosure is not limited to the following embodiments. Components denoted by the same reference numerals in the present specification and the drawings mutually denote the same components.

Embodiment 1

In an embodiment 1, first, a phenomenon and calculation results of Talbot effect will be described. Next, an optical waveguide which can reduce insertion loss when light enters from a slab waveguide toward an arrayed waveguide, or when the light enters from the arrayed waveguide toward the slab waveguide will be described based on the phenomenon and the calculation results of the Talbot effect.

The Talbot effect means that when light enters a grating, diffracted lights interfere with each other, whereby a light intensity distribution similar to a pattern of the grating is realized as a self-image of the grating at a position apart a distance from the grating, specified according to the wavelength of the light and a period of the grating, and the Talbot effect is applied to a Talbot interferometer.

Figure 2:
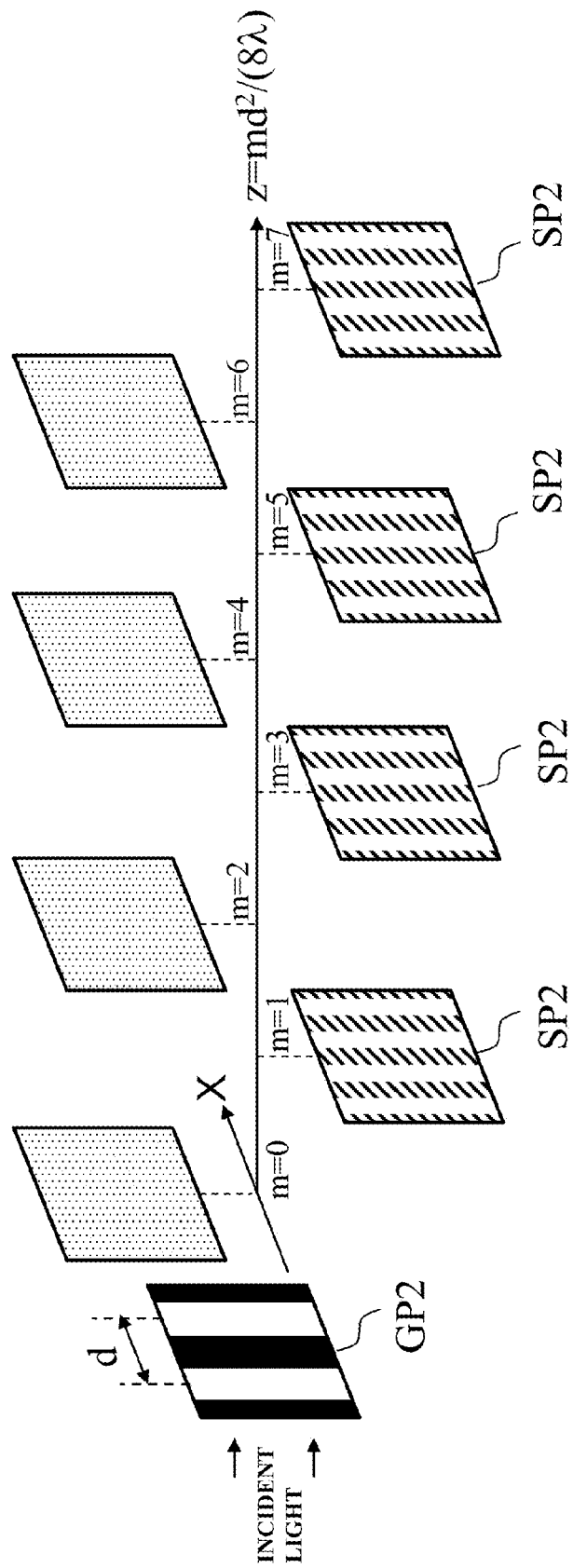
FIG. 2 is a view showing a phenomenon of Talbot effect.

FIGS. 1 and 2 are views showing the phenomenon of the Talbot effect. Gratings GP1 and GP2 are phase gratings giving a phase difference to incident light. The phenomenon of the Talbot effect associated with the phase grating GP1 is shown in FIG. 1, and the phenomenon of the Talbot effect associated with the phase grating GP2 is shown in FIG. 2. Each period of the phase gratings GP1 and GP2 is d, the phase difference given to the incident light by the phase grating GP1 is 90°, and the phase difference given to the incident light by the phase grating GP2 is 180°. The phase gratings GP1 and GP2 are arranged at a position of z=0 in an x-y plane (y axis is not shown in FIGS. 1 and 2) (in FIGS. 1 and 2, as a matter of convenience, the phase gratings GP1 and GP2 are shown on the left side of the drawing relative to the position of z=0). The wavelength of the incident light is $\lambda$. The incident light enters as parallel light in the z-axis direction as shown by arrows at the left ends of FIGS. 1 and 2.

First, the phenomenon of the Talbot effect associated with the phase grating GP1 will be described. When $z=md^2/(2\lambda)$, a light intensity distribution formed immediately after the phase grating GP1 is uniform at the position of m=0 as shown by a sand portion, and light intensity distributions similar to this light intensity distribution are shown at positions of m=2, 4, 6, 8, ..., 4n+2, 4n+4, ... (n is an integer of not less than 0). Meanwhile, at positions of m=1, 3, 5, 7, ..., 4n+1, 4n+3, ..., self-images SP1 of the phase grating GP1 are clearly formed as shown by diagonal lines and white portions. Although the self-images SP1 of the phase grating GP1 are formed at positions other than the positions of m=1, 3, 5, 7, ..., 4n+1, 4n+3, ..., the self-images SP1 are not clearly formed but is blurred.

The intensity period of the self-image SP1 of the phase grating GP1 is d. The self-images SP1 of the phase grating GP1 formed at the positions of m=1, 5, ..., 4n+1, ... are shifted by d/2 in the x-axis direction in comparison with the self-images SP1 of the phase grating GP1 formed at the positions of m=3, 7, ..., 4n+3, ....

Next, the phenomenon of the Talbot effect associated with the phase grating GP2 will be described. When $z=md^2/(8k)$, the light intensity distribution formed immediately after the phase grating GP2 is uniform at the position of m=0 as shown by a sand portion, and light intensity distributions similar to this light intensity distribution are shown at the positions of m=2, 4, 6, 8, ..., 2n, ... (n is an integer of not less than 0). Meanwhile, at the positions of m=1, 3, 5, 7, ..., 2n+1, ..., self-images SP2 of the phase grating GP2 are clearly formed as shown by diagonal lines and white portions. Although the self-images SP2 of the phase grating GP2 are formed at positions other than the positions of m=1, 3, 5, 7, ..., 2n+1, ..., the self-images SP2 are not clearly formed but is blurred. The intensity period of the self-image SP2 of the phase grating GP2 is d/2. The self-image SP2 of the phase grating GP2 does not shift for each order.

Figure 3:
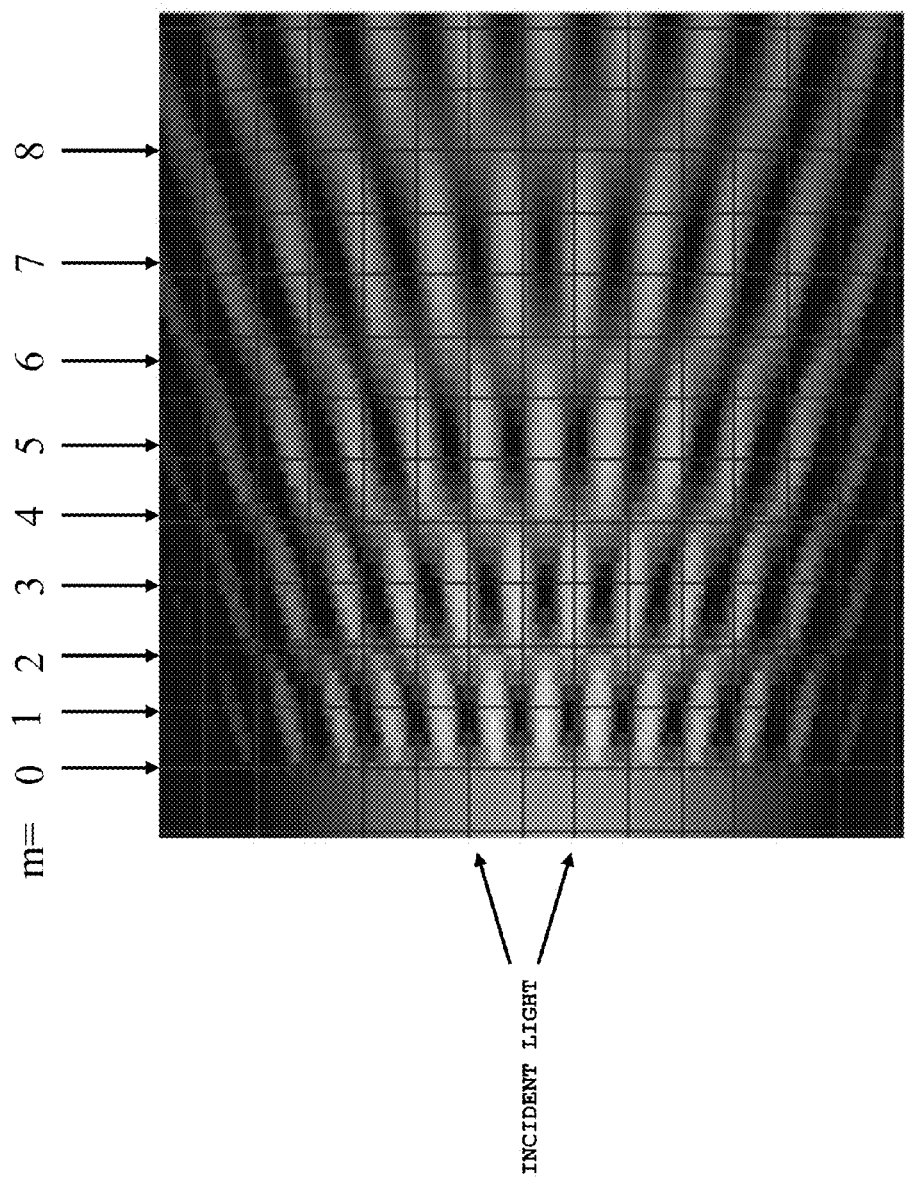
FIG. 3 is a view showing calculation results of Talbot effect.
Figure 4:
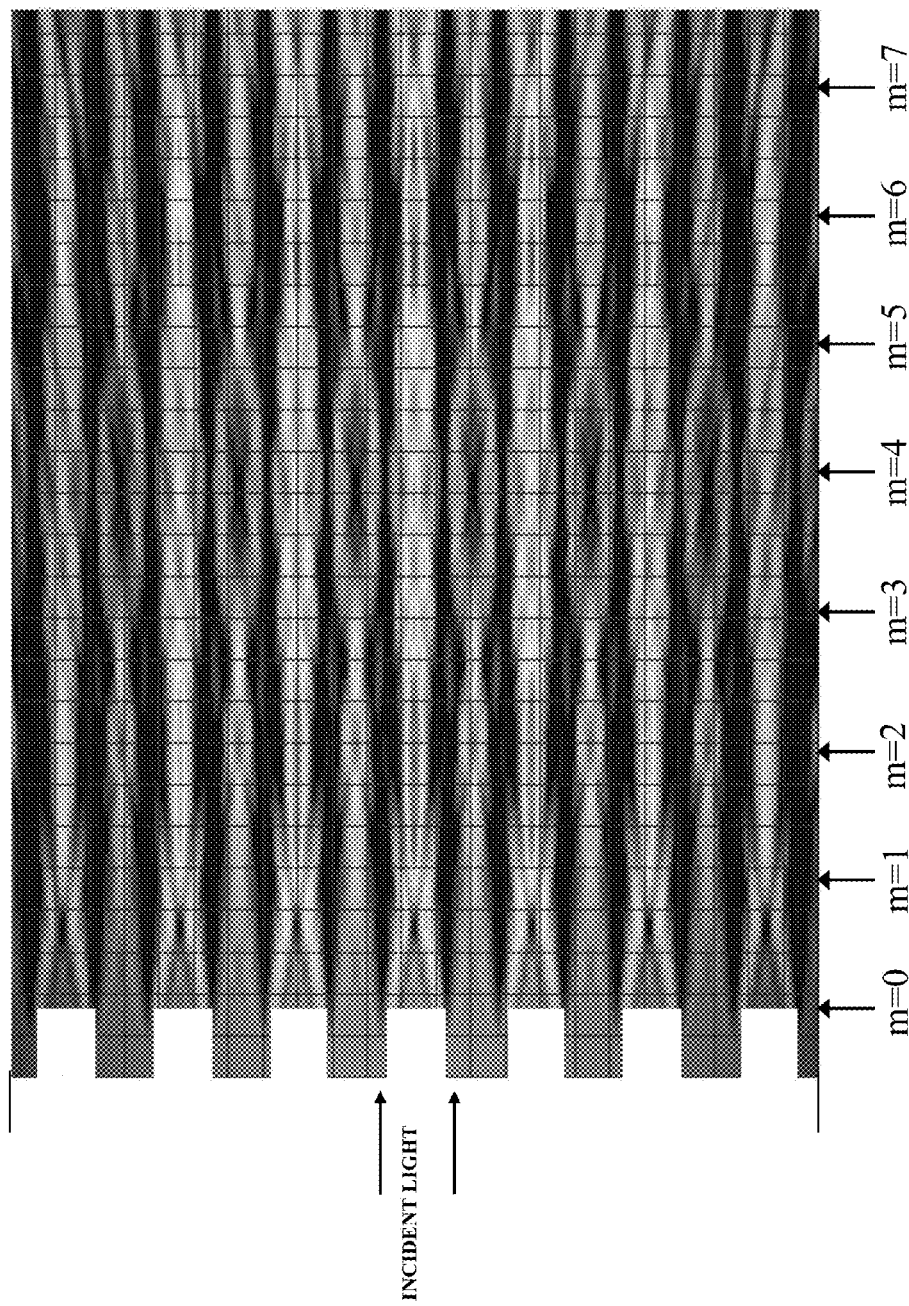
FIG. 4 is a view showing calculation results of Talbot effect.

FIG. 3 is a view showing calculation results of the Talbot effect of the phase grating GP1. In FIG. 1, although incident light is parallel light, in FIG. 3 the incident light is diffusion light in consideration that the light propagating in the slab waveguide is not parallel light but diffusion light. The incident light enters as diffusion light toward the right direction as shown by arrows at the left end of FIG. 3. FIG. 4 is a view showing calculation results of the Talbot effect of the phase grating GP2. In FIG. 4, incident light is parallel light. The incident light enters as parallel light toward the right direction as shown by arrows at the left end of FIG. 4. In FIGS. 3 and 4, the phase gratings GP1 and GP2 are arranged at the position of m=0.

Although the self-images SP1 of the phase grating GP1 are clearly formed at the positions of m=1, 3, 5, 7, ..., 4n+1, 4n+3, ... as shown by a clear black and white gradation, the self-images SP1 are not clearly formed at the positions of m=2, 4, 6, 8, ..., 4n+2, 4n+4, ... as shown by an unclear black and white gradation. At positions other than the positions of m=1, 3, 5, 7, ..., 4n+1, 4n+3, ..., the closer to the positions of m=1, 3, 5, 7, ..., 4n+1, 4n+3, ..., the more clearly the self-image SP1 of the phase grating GP1 are formed, and the closer to the positions of m=2, 4, 6, 8, ..., 4n+2, 4n+4, ..., the less clearly the self-image SP1 of the phase grating GP1 is formed. The positions of m=0, 1, 2, 3, ... are not arranged at regular intervals because the incident light is not parallel light but diffusion light.

When FIG. 3 is seen as a whole, the black and white gradation is spread in the vertical direction of FIG. 3 as it progresses in the right side direction. When FIG. 3 is seen in detail, the black and white gradation drastically changes near the positions of m=2, 4, 6, 8, ..., 4n+2, 4n+4, .... This phenomenon corresponds to that in FIG. 1, the self-images SP1 of the phase grating GP1 formed at the positions of m=1, 5, ..., 4n+1, ... are shifted by d/2 in the x-axis direction in comparison with the self-images SP1 of the phase grating GP1 formed at the positions of m=3, 7, ..., 4n+3, .... The self-images SP1 of the phase grating GP1 formed at the positions of m=1, 3, 5, 7, ..., 4n+1, 4n+3, ..., are more clearly formed as m becomes smaller. Although the calculation results of FIG. 4 and a schematic drawing in FIG. 2 show similar tendencies, in FIG. 4 a peak having the same period as the period of the phase grating GP2 is confirmed at the positions of m=2, 4, .... This is because while the simulation in FIG. 4 is calculation based on a general optical circuit, when the phase grating GP2 is formed of a material having a low refractive index difference such as a core material and a clad material, the phase grating GP2 is elongated in the light propagation direction, light propagating in a portion having a low refractive index couples to a portion having a high refractive index as the propagation distance becomes longer, and the intensity distribution occurs at a tail end of the phase grating GP2.

Figure 5:
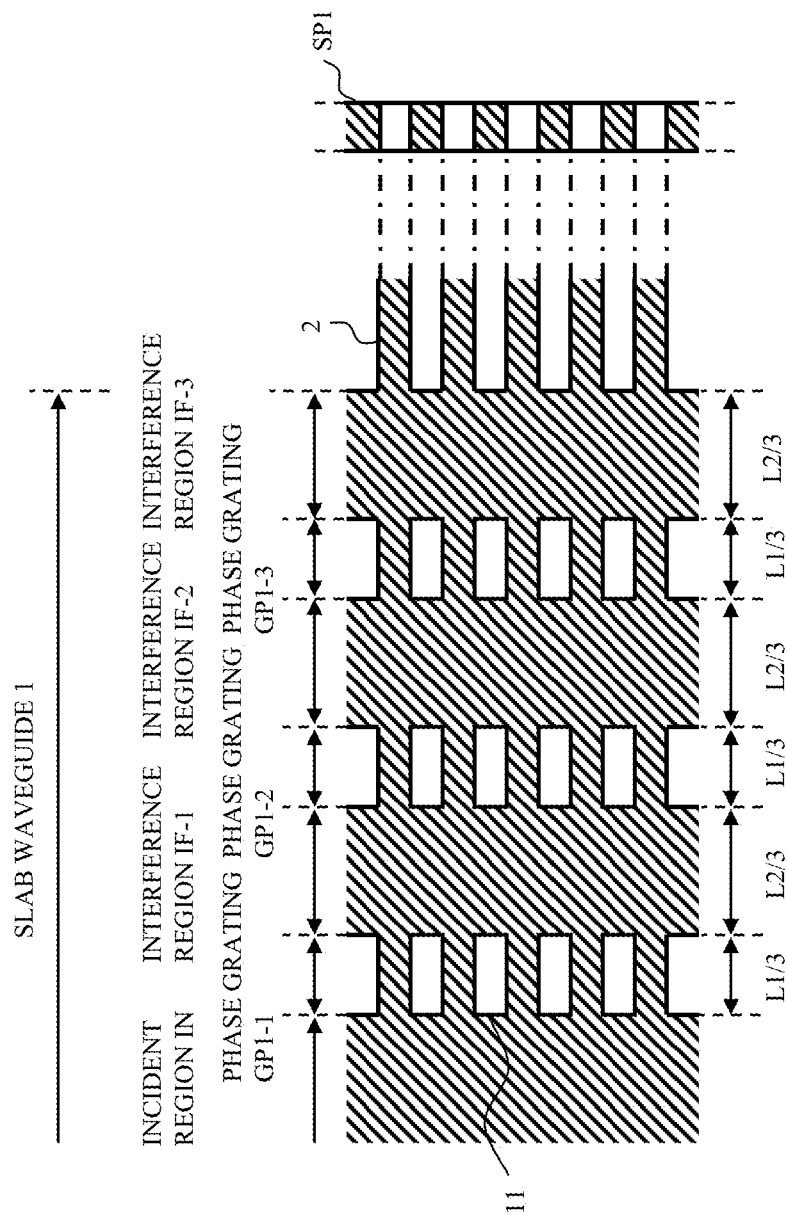
FIG. 5 is a view showing a positional relationship between a phase grating of a slab waveguide and an incident end of an arrayed waveguide.
Figure 6:
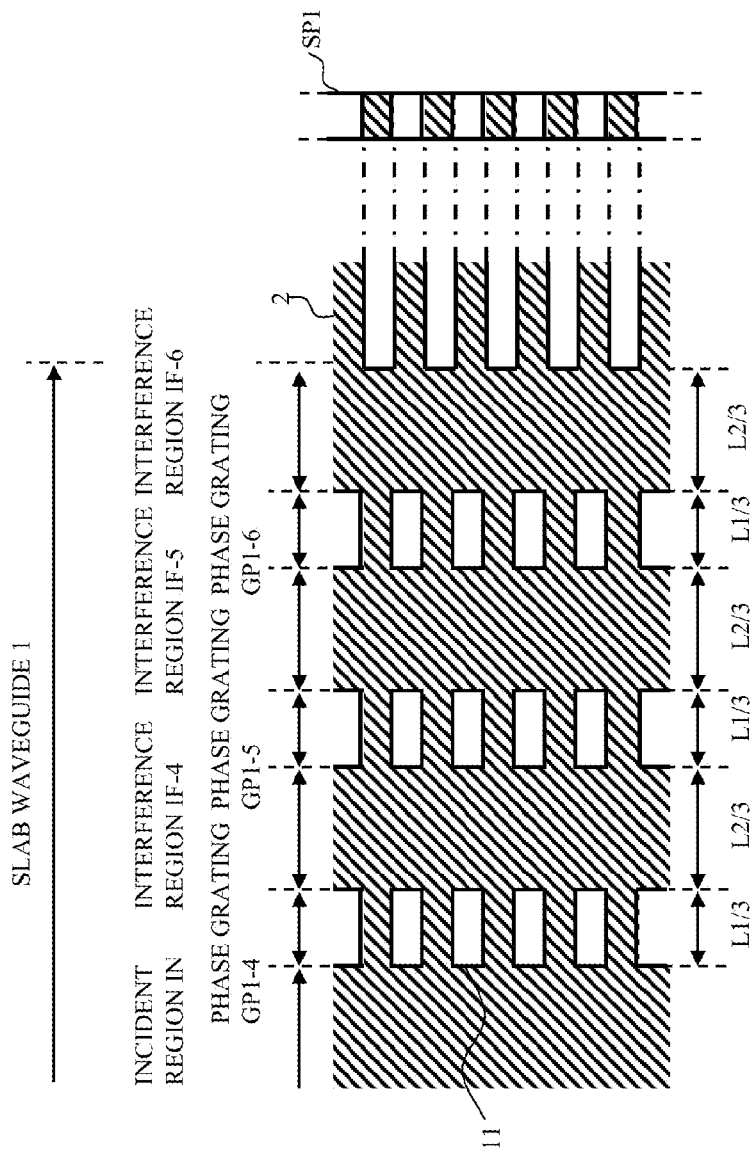
FIG. 6 is a view showing a positional relationship between a phase grating of a slab waveguide and an incident end of an arrayed waveguide.
Figure 7:
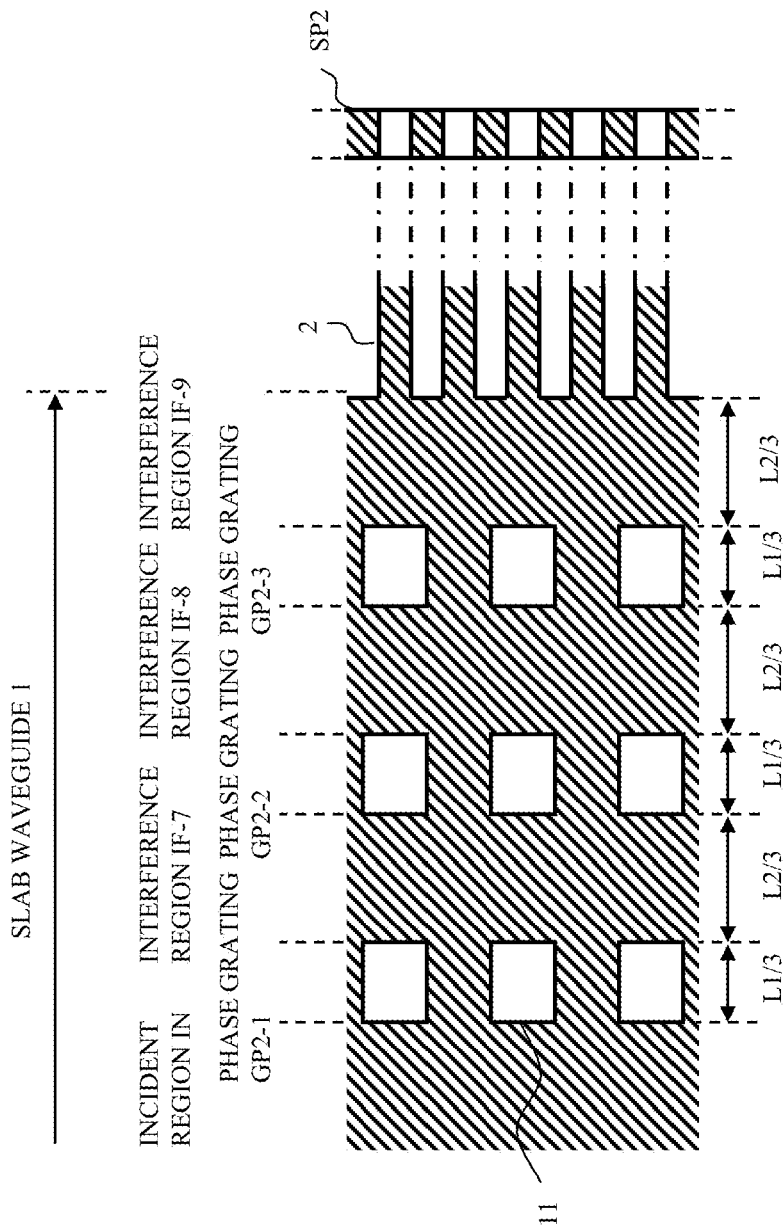
FIG. 7 is a view showing a positional relationship between a phase grating of a slab waveguide and an incident end of an arrayed waveguide.

Next, the optical waveguide, which can reduce the insertion loss when light enters from the slab waveguide toward the arrayed waveguide, or when the light enters from the arrayed waveguide toward the slab waveguide, will be described based on the phenomenon and the calculation results of the Talbot effect. FIGS. 5 to 7 are views showing a positional relationship between the phase grating GP1 or GP2 of a slab waveguide 1 and an end of an arrayed waveguide 2. The respective left sides of FIGS. 5 to 7 show the overall configuration of the optical waveguide. The respective right sides of FIGS. 5 and 6 show the self-image SP1 of the phase grating GP1. The right side of FIG. 7 shows the self-image SP2 of the phase grating GP2. In FIGS. 5 to 7, the left and right side drawings are positionally aligned in the vertical direction by an alternative long and short dashed line. In FIGS. 5 and 6, the positional relationship between the phase grating GP1 of the slab waveguide 1 and the end of the arrayed waveguide 2 is different from each other.

In the slab waveguide 1 of FIG. 5, an incident region IN, a phase grating GP1-1, an interference region IF-1, a phase grating GP1-2, an interference region IF-2, a phase grating GP1-3, and an interference region IF-3 are arranged in this order from the left side to the right side in FIG. 5. In the slab waveguide 1 of FIG. 6, the incident region IN, a phase grating GP1-4, an interference region IF-4, a phase grating GP1-5, an interference region IF-5, a phase grating GP1-6, and an interference region IF-6 are arranged in this order from the left side to the right side in FIG. 6. In the slab waveguide 1 of FIG. 7, the incident region IN, a phase grating GP2-1, an interference region IF-7, a phase grating GP2-2, an interference region IF-8, a phase grating GP2-3, and an interference region IF-9 are arranged in this order from the left side to the right side in FIG. 7.

The phase gratings GP1-1, GP1-2, and GP1-3 of FIG. 5 as an integrated phase grating GP1 giving a phase difference of 90° to incident light have a function of forming a self-image. The phase gratings GP1-4, GP1-5, and GP1-6 of FIG. 6 as an integrated phase grating GP1 giving a phase difference of 90° to incident light have a function of forming a self-image. The phase gratings GP2-1, GP2-2, and GP2-3 of FIG. 7 as an integrated phase grating GP2 giving a phase difference of 180° to incident light have a function of forming a self-image.

In the interference regions IF-1, IF-2, and IF-3 of FIG. 5, the total width in the direction substantially parallel to the light propagation direction is z for clear formation of the self-image SP1 of the phase grating GP1 in FIG. 1. In the interference regions IF-4, IF-5, and IF-6 of FIG. 6, the total width in the direction substantially parallel to the light propagation direction is z for clear formation of the self-image SP1 of the phase grating GP1 in FIG. 1. In the interference regions IF-7, IF-8, and IF-9 of FIG. 7, the total width in the direction substantially parallel to the light propagation direction is z for clear formation of the self-image SP2 of the phase grating GP2 in FIG. 2.

As described above, in order to clearly form the self-image of the phase grating due to the Talbot effect, in the phase grating and the interference region the width in the direction substantially parallel to the light propagation direction is designed, the phase grating and the interference region having the designed width are divided into a plurality of regions in a plane substantially perpendicular to the light propagation direction, and the divided phase gratings and the divided interference regions are alternately arranged in the direction substantially parallel to the light propagation direction.

In the incident region IN, the incident light to the slab waveguide 1 is propagated. The phase grating GP1 or GP2 is formed of regions shown by diagonal lines and white portions having different refractive indices. The refractive index of the region shown by the diagonal lines may be higher or lower than the refractive index of the region shown by the white portion. Incident light propagates in the region with a high refractive index at low speed and propagates in the region with a low refractive index at high speed. The phase grating GP1 or GP2 changes the speed of light according to the position in the vertical direction of FIGS. 5 to 7 and gives a phase difference to the incident light. In the interference region IF, diffraction light in the phase grating GP1 or GP2 is interfered with.

The arrayed waveguide 2 is connected to the end of the slab waveguide 1 in a constructive interference portion shown by the white portion of the self-image SP1 of the phase grating GP1 or the self-image SP2 of the phase grating GP2. Namely, since diffraction light is concentrically distributed in the constructive interference portion shown by the white portion of the self-image SP1 of the phase grating GP1 or the self-image SP2 of the phase grating GP2, the diffraction light propagates as a propagation mode in the arrayed waveguide 2. Since the diffraction light is less distributed in a destructive interference portion shown by the diagonal lines of the self-image SP1 of the phase grating GP1 or the self-image SP2 of the phase grating GP2, the diffraction light does not radiate in the clad layer as a radiation mode. In FIGS. 5 to 7, a plurality of the arrayed waveguides 2 are connected, only a single waveguide may be connected.

In FIG. 5, the constructive interference portion shown by the white portion of the self-image SP1 of the phase grating GP1 is formed at the position corresponding to the region shown by the diagonal lines of the phase grating GP1, and the end of the arrayed waveguide 2 is connected to the constructive interference portion. In FIG. 6, the constructive interference portion shown by the white portion of the self-image SP1 of the phase grating GP1 is formed at the position corresponding to the region shown by the white portion of the phase grating GP1, and the end of the arrayed waveguide 2 is connected to the constructive interference portion. The different positional relationships thus exist as the positional relationship between the phase grating GP1 of the slab waveguide 1 and the end of the arrayed waveguide 2, and this phenomenon corresponds to that as shown in FIG. 1, the self-images SP1 of the phase grating GP1 formed at the positions of m=1, 5, . . . , 4n+1, . . . are shifted by d/2 in the x-axis direction in comparison with the self-images SP1 of the phase grating GP1 formed at the positions of m=3, 7, . . . , 4n+3, . . . .

In FIG. 7, the constructive interference portion shown by the white portion of the self-image SP2 of the phase grating GP2 is formed at a position advanced in a direction substantially parallel to the light propagation direction from the regions shown by the diagonal lines and the white portion of the phase grating GP2, and the end of the arrayed waveguide 2 is connected to the constructive interference portion. Although the period of the phase grating GP1 is the same as the period of the arrayed waveguide 2 in FIGS. 5 and 6, the period of the phase grating GP2 is twice the period of the arrayed waveguide 2 in FIG. 7.

As described above, due to the Talbot effect, the self-images SP1 and SP2 of the phase grating GP1 and GP2 are formed according to the wavelength X, of the incident light and the periods of the phase gratings GP1 and GP2 formed in the slab waveguide 1. The end of the arrayed waveguide 2 is disposed at the positions of the constructive interference portion s of the self-image SP1 and SP2 of the phase gratings GP1 and GP2, whereby when light enters from the slab waveguide 1 toward the arrayed waveguide 2, the light is concentrated on the arrayed waveguide 2 and propagates as a propagation mode. Accordingly, when the light enters from the slab waveguide 1 toward the arrayed waveguide 2, the insertion loss can be reduced. Due to reciprocity of light, this also applies to the case where the light enters from the arrayed waveguide 2 toward the slab waveguide 1.

When the arrayed waveguide 2 is branched near the boundary with the slab waveguide 1, each end of the branched arrayed waveguides 2 is disposed at the position of the constructive interference portion. The phase difference given to the incident light by the phase grating may be 90° or 180° or may be 45° or 135°, and phase differences other than the above phase difference may be used as long as the self-image of the phase grating can be clearly formed by the Talbot effect.

It is important to reduce the insertion loss of light when the light enters from the slab waveguide 1 toward the arrayed waveguide 2 or when the light enters from the arrayed waveguide 2 toward the slab waveguide 1, and, at the same time, it is also important to reduce the radiation loss of light when the light propagates in the region having a low refractive index of the phase grating. There will be described the phenomenon that the present embodiment is effective to reduce the radiation loss of light when the light propagates in the region having a low refractive index of the phase grating.

In the present embodiment, there has been described the case where a plurality of the phase gratings is arranged at a distance from each other in the direction substantially parallel to the light propagation direction (hereinafter referred to as "the first case"). Comparative examples include a case where a single phase grating having a light propagation direction width equal to the total width in the light propagation direction of a plurality of phase gratings is disposed (hereinafter referred to as "the second case") and a case where the refractive index difference between the region having a high refractive index and the region having a low refractive index of a single phase grating is increased, and a light propagation direction width of the single phase grating is reduced (hereinafter referred to as "the third case"), and the present embodiment and the comparative examples will be compared with each other.

In order to reduce the radiation loss of light when the light propagates in the region having a low refractive index of the phase grating, it is preferable to reduce the light propagation direction width of the region having a low refractive index. Thus, the second case where the light propagation direction width of a single phase grating is large is not suitable. Rather, the first case where the light propagation direction width of each phase grating is small is suitable even if the total width in the light propagation direction of the plurality of phase gratings in the first case is equal to the light propagation direction width of a single phase grating in the second case.

In order to reduce the light propagation direction width of the region having a low refractive index, the third case where the light propagation direction width of a single phase grating is small is also suitable. However, in order to omit an additional process such as additional ultraviolet irradiation, the third case where the refractive index difference between the region having a high refractive index and the region having a low refractive index is large is not suitable. Namely, in the first case described in the present embodiment, the light radiation from the region having a low refractive index of the phase grating can be reduced, and, at the same time, the additional process such as additional ultraviolet irradiation can be omitted.

When a single phase grating is divided into a plurality of phase gratings, if the light propagation direction width of each of the divided phase gratings is random for each phase grating, reflection of light having a specific wavelength can be suppressed.

Embodiment 2

In an embodiment 2, a method of designing an optical waveguide will be described. First, a method of setting a total light propagation direction width L1 of phase gratings GP1 and GP2 will be described. Next, a method of setting a total light propagation direction width L2 of an interference region IF will be described. Finally, a method of setting a position of an end of an arrayed waveguide 2 will be described.

In FIGS. 5 and 6, in order to clearly form a self-image SP1 of the phase grating GP1 at the end of the arrayed waveguide 2, the total light propagation direction width L1 of the phase grating GP1 is set so that a phase difference given to light by the phase grating GP1 is preferably 80° to 100°, more preferably 90°. The total light propagation direction width L1 of the phase grating GP1 is a total width in the light propagation direction of phase gratings GP1-1, GP1-2, and GP1-3 or a total width in the light propagation direction of phase gratings GP1-4, GPI-5, and GP1-6. In FIG. 7, in order to clearly form a self-image SP2 of the phase grating GP2 at the end of the arrayed waveguide 2, the total light propagation direction width L1 of the phase grating GP2 is set so that a phase difference given to light by the phase grating GP2 is preferably 170° to 190°, more preferably 180°. The total light propagation direction width L1 of the phase grating GP2 is a total width in the light propagation direction of phase gratings GP2-1, GP2-2, and GP2-3.

Wavelength in vacuum of light is represented by $\lambda$, a refractive index of a region having a high refractive index is represented by n, the refractive index of a region having a low refractive index is represented by $n-\delta n$, and a relative refractive index difference between the region having a high refractive index and the region having a low refractive index is represented by $\Delta = \delta n/n$. A phase lead angle at the time when light passes from a start end to a terminal end of the region having a high refractive index is $L1 \div (\lambda/n) \times 2\pi = 2\pi n L1/\lambda$. The phase lead angle at the time when light passes from a start end to a terminal end of the region having a low refractive index is $L1 \div (\lambda/(n-\delta n)) \times 2\pi = 2\pi(n-\delta n)L1/\lambda$. The phase difference given to light by the phase grating GP is $2\pi n L1/\lambda$, $-2\pi(n-\delta n)L = 2\pi \delta n L1/\lambda = 2\pi n \Delta L1/\lambda$. In FIGS. 5 and 6, it is preferably set to $L1 = \lambda/(4n\Delta)$ so that the phase difference given to light by the phase grating GP1 is 90°. For example, when $\lambda=1.55$ μm, n=1.45, and $\Delta=0.75\%$, it is preferably that L1 is set to be about 35 μm so that the phase difference given to light by the phase grating GP1 is 90°. In FIG. 7, it is preferably set to $L1 = \lambda/(2 nA)$ so that the phase difference given to light by the phase grating GP2 is 180°. For example, when $\lambda = 1.55$ μm, n=1.45, and $\Delta=0.75\%$, it is preferably that L1 is set to be about 70 μm so that the phase difference given to light by the phase grating GP2 is 180°.

In FIG. 5, although the light propagation direction widths of the phase gratings GP1-1, GP1-2, and GP1-3 are equally set to L1/3, the light propagation direction widths may not be set equally. In FIG. 6, although the light propagation direction widths of the phase gratings GP1-4, GP1-5, and GP1-6 are equally set to L1/3, the light propagation direction widths may not be set equally. In FIG. 7, although the light propagation direction widths of the phase gratings GP2-1, GP2-2, and GP2-3 are equally set to L1/3, the light propagation direction widths may not be set equally. In FIGS. 5 to 7, the phase gratings GP1 and GP2 are divided into three regions. However, the division number of the phase gratings GP1 and GP2 is not limited to only three and is determined by the accuracy of a manufacturing method of an embodiment 3.

In FIGS. 5 to 7, in order to clearly the self-images SP1 and SP2 of the phase gratings GP1 and GP2 at the end of the arrayed waveguide 2, the total light propagation direction width L2 of the interference region IF is set based on the description of FIGS. 1 to 4. The total light propagation direction width L2 of the interference region IF is a total width in the light propagation direction of interference regions IF-1, IF-2, and IF-3, a total width in the light propagation direction of interference regions IF-4, IF-5, and IF-6, or a total width in the light propagation direction of interference regions IF-7, IF-8, and IF-9.

When the wavelength in vacuum of light is represented by $\lambda$, and the refractive index of the interference region IF is represented by n equal to the refractive index of the region having a high refractive index, the wavelength in the interference region IF of light is $\lambda/n$. Based on the description of FIG. 1, in FIGS. 5 and 6, it is set as optimum design so that $L2 = md^2/(2(\lambda/n))$ with respect to the phase grating GP1. For example, when d=10.0 μm, $\lambda=1.55$ and n=1.45, it is optimum design so that L2 is set to be about 47 μm when m=1. Based on the description of FIG. 2, in FIG. 7, it is set as optimum design so that $L2 = md^2/(8(\lambda/n))$ with respect to the phase grating GP2. For example, when d=20.0 μm, $\lambda=1.55$ μm, and n=1.45, it is optimum design so that L2 is set to be about 47 μm when m=1. Based on the description of FIG. 3, the calculation result of the Talbot effect is obtained, further considering the degree of diffusion of light, and L2 is set as the optimum design.

In FIG. 5, although the light propagation direction widths of the interference regions IF-1, IF-2, and IF-3 are equally set to L2/3, the light propagation direction widths may not be set equally. In FIG. 6, although the light propagation direction widths of the interference regions IF-4, IF-5, and IF-6 are equally set to L2/3, the light propagation direction widths may not be set equally. In FIG. 7, although the light propagation direction widths of the interference regions IF-7, IF-8, and IF-9 are equally set to L2/3, the light propagation direction widths may not be set equally. In FIGS. 5 to 7, the interference regions IF are divided into three regions. However, the division number of the interference regions IF is not limited to only three and is determined by the accuracy of the manufacturing method of the embodiment 3.

Figure 8:
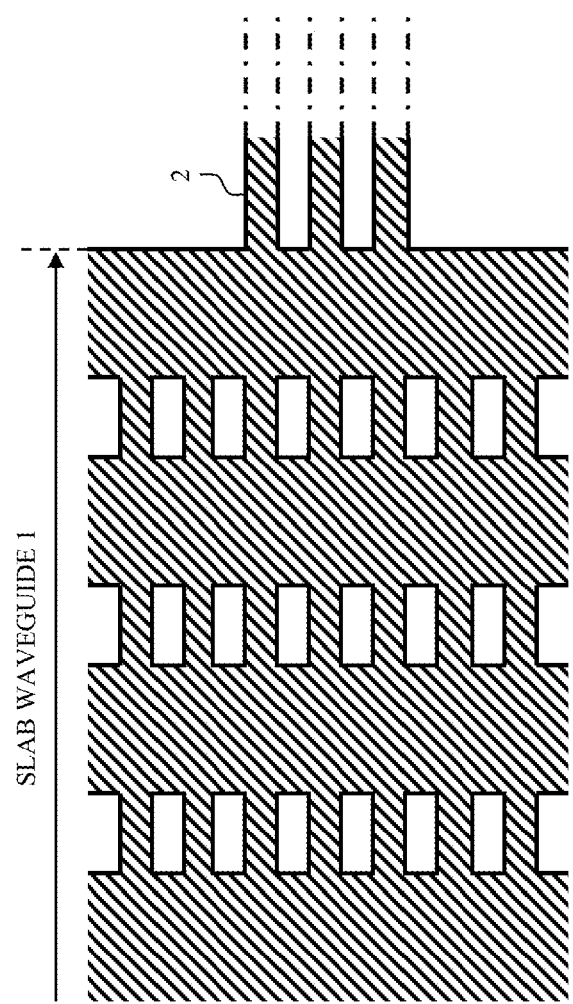
FIG. 8 is a view showing a structure of an optical waveguide.

After the total light propagation direction width L2 of the interference region IF is set based on the description of FIGS. 1 to 4, a constructive interference portion of the self-image SP of the phase grating GP at the terminal end of the slab waveguide 1 is set as the position of the end of the arrayed waveguide 2 based on the description of FIGS. 1 to 4. It is preferable that among the ends of the plurality of arrayed waveguides 2, the self-image SP of the phase grating GP is clearly formed at not only the end of the central arrayed waveguide 2 but also the ends of the arrayed waveguides 2 disposed at both edges of a plurality of the arrayed waveguide 2. Thus, the positional relationship between the phase grating GP of the slab waveguide 1 and the end of the arrayed waveguide 2 is preferably the positional relationship shown in FIG. 8. Namely, it is preferable that the number of the regions having a high refractive index of the phase grating GP is larger than the number of the arrayed waveguides 2.

In order to reduce the size of the optical waveguide, and in order to clearly form the self-images SP1 and SP2 of the phase gratings GP1 and GP2, it is preferable that m is reduced and the total light propagation direction width L2 of the interference region IF is reduced. The phase gratings GP1 and GP2 may have any shape including a shape to be described in the embodiment 3 as long as it has a function of diffracting light. As described above, in this disclosure, the size of the optical waveguide does not increase, the design does not become difficult. When this disclosure is not employed, the propagation loss between the slab waveguide 1 and the arrayed waveguide 2 is approximately 0.45 dB; however, when this disclosure is employed in the above designing method, the loss can be reduced to not more than 0.1 dB.

Figure 9A:
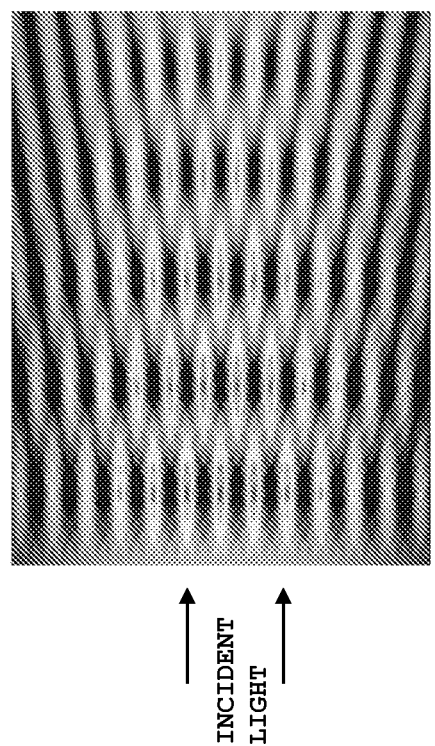
FIGS. 9A, 9B and 9C are views showing calculation results of Talbot effect.
Figure 9B:
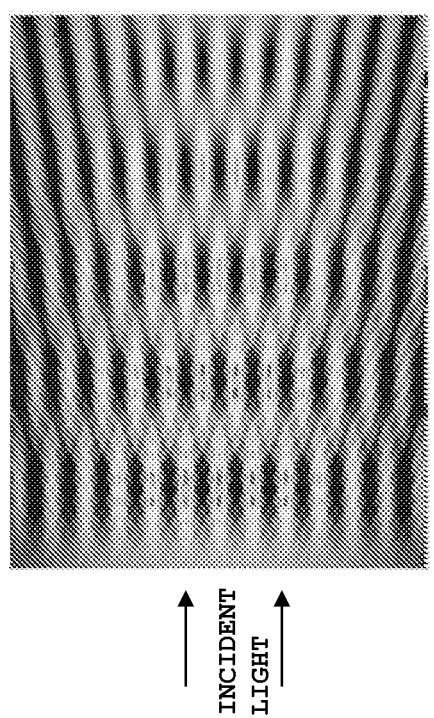
Figure 9C:
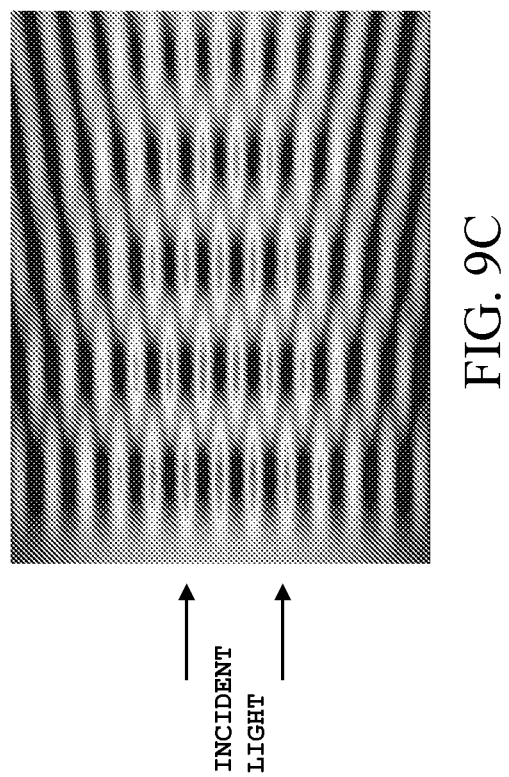

FIG. 9 is a view showing the calculation results of the Talbot effect of the phase grating GP1. The incident light enters as parallel light toward the right direction, and the left end of the phase grating GP1-1 of FIG. 5 or the left end of the phase grating GP1-4 of FIG. 6 is arranged at each left end of FIGS. 9A, 9B, and 9C. FIG. 9A shows a case where two phase gratings as an integrated phase grating GP1 have a function of forming a self-image. FIG. 9B shows a case where four phase gratings as an integrated phase grating GP1 have a function of forming a self-image. FIG. 9C shows a case where eight phase gratings as an integrated phase grating GP1 have a function of forming a self-image. In each of FIGS. 9A to 9C, the calculation results of the Talbot effect of the phase grating GP1 are similar to the calculation results of the Talbot effect of the phase grating GP1 in FIG. 3 with the exception of that the incident light is parallel light or diffusion light. The Talbot effect does not depend on the division number of the phase grating.

Embodiment 3

In the embodiment 3, a method of manufacturing an optical waveguide will be described. The phase gratings GP1 and GP2 shown in FIGS. 5 to 7 are provided with refractive index difference regions 11. The refractive index difference regions 11 are arranged at a distance from each other in a direction substantially perpendicular to a light propagation direction and a direction substantially parallel to the light propagation direction and have a refractive index different from the refractive index of a region shown by diagonal lines. Although the refractive index difference region 11 has a rectangular shape, the refractive index difference region 11 may have any shape.

The refractive index of the refractive index difference region 11 may be larger or smaller than the refractive index of the region shown by diagonal lines. A region having a high refractive index and a region having a low refractive index are alternately arranged in the direction substantially perpendicular to the light propagation direction and the direction substantially parallel to the light propagation direction, whereby the phase gratings GP1 and GP2 can be easily formed.

The method of manufacturing an optical waveguide shown in FIGS. 5 to 7 includes a method using lithography and etching and a method using ultraviolet irradiation.

In the method using lithography and etching, first, $SiO_2$ fine particles becoming a lower clad layer and $SiO_2$—$GeO_2$ fine particles becoming a core layer are deposited on an Si substrate by a flame hydrolysis deposition method, and are heated and melted to be transparent. Next, an unnecessary portion of the core layer is removed by lithography and etching, and an optical circuit pattern is formed. At the same time, an unnecessary portion of the core layer is removed from a portion becoming the refractive index difference region 11. Finally, the $SiO_2$ fine particles becoming an upper clad layer are deposited by the flame hydrolysis deposition method, and are heated and melted to be transparent, whereby when the upper clad layer is formed, the portion becoming the refractive index difference region 11 is filled with a clad material. Since the clad material is filled in the portion becoming the refractive index difference region 11, the refractive index of the refractive index difference region 11 is smaller than the refractive index of the region shown by diagonal lines. In the above case, although the refractive index difference region 11 is formed by the formation process of the slab waveguide 1 and the arrayed waveguide 2, after the formation of the slab waveguide 1 and the arrayed waveguide 2, grooving is applied to the portion becoming the refractive index difference region 11, and resin and so on with a refractive index different from the refractive index of the core layer may be filled, or the refractive index difference region 11 may be formed with an air space by only grooving.

The method using ultraviolet irradiation utilizes the phenomenon that the refractive index is increased by ultraviolet irradiation. In the first method, after the formation of the lower clad layer and the core layer, or after the formation of the lower clad layer, the core layer, and the upper clad layer, a mask material is formed on the portion becoming the refractive index difference region 11, and the refractive indices of portions other than the portion becoming the refractive index difference region 11 are changed by ultraviolet irradiation, whereby the refractive index difference region 11 is formed. The refractive index of the refractive index difference region 11 is lower than the refractive index of the region shown by diagonal lines. In the second method, after the formation of the lower clad layer and the core layer, or after the formation of the lower clad layer, the core layer, and the upper clad layer, a mask material is formed on a portion other than the portion becoming the refractive index difference region 11, and the refractive index of the portion becoming the refractive index difference region 11 is changed by ultraviolet irradiation, whereby the refractive index difference region 11 is formed. The refractive index of the refractive index difference region 11 is higher than the refractive index of the region shown by diagonal lines.

The interference region IF may be provided with any material as long as it has a function of interfering light. For example, the interference region IF may be provided with at least one of materials including a core material, a clad material, $SiO_2$-$GeO_2$ irradiated with ultraviolet light, resin, and air.

The method of manufacturing an optical waveguide shown in FIGS. 10 and 11 is similar to the method of manufacturing an optical waveguide shown in FIGS. 5 to 7. In a case where an upper clad material, resin, and so on are filled in the refractive index difference region to form the refractive index difference region, when a periphery of the refractive index difference region 11 is surrounded by the region shown by diagonal lines as shown in FIGS. 5 to 7, it may be difficult to uniformly fill the upper clad material, the resin, and so on. Meanwhile, as shown in FIGS. 10 and 11, when a refractive index difference region 12 forming each phase grating GP is integrated across the entirety of each phase grating GP, it is easy to uniformly fill the upper clad material, the resin, and so on. Hereinafter, in a method of manufacturing the optical waveguide shown in FIG. 5, a case where the refractive index difference region 12 is formed instead of the refractive index difference region 11 will be described. This also applies to the case where the refractive index difference region 12 is formed instead of the refractive index difference region 11 in a method of manufacturing the optical waveguide shown in FIGS. 6 and 7.

Figure 10A:
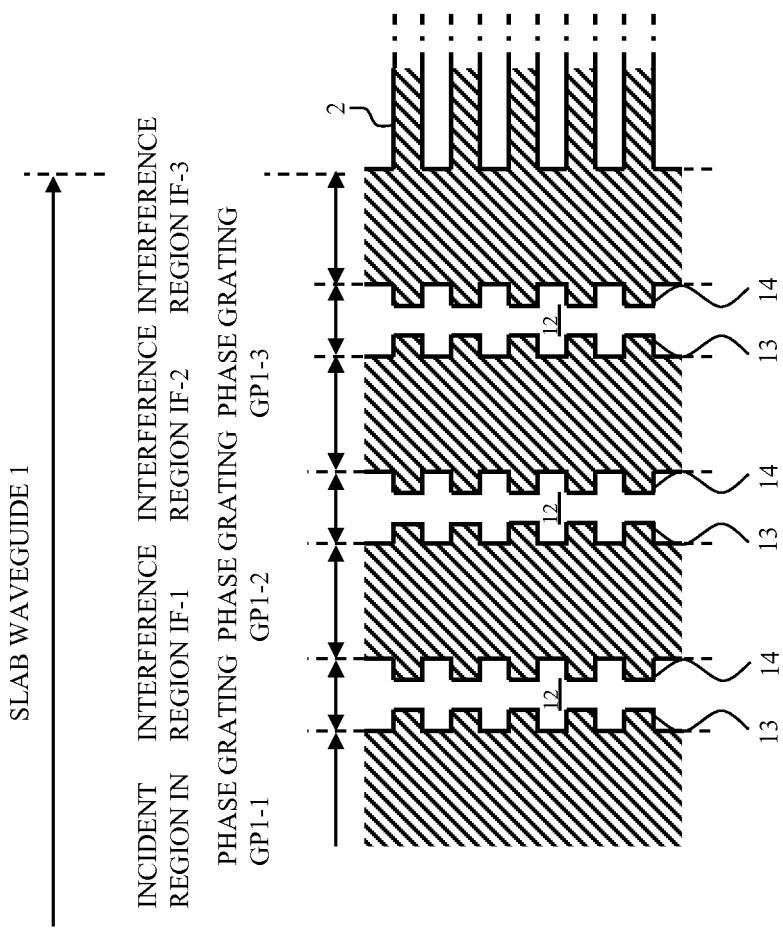
FIGS. 10A and 10B are views showing a structure of an optical waveguide.

Each phase grating GP1 shown in FIG. 10A is provided with the refractive index difference region 12 and convex regions 13 and 14. The refractive index difference region 12 is provided with a region with a large width and a region with a small width in the direction substantially perpendicular to the light propagation direction and is integrated across the entire phase grating GPI. The region with a large width is arranged in the slab waveguide 1 at a distance in the direction substantially perpendicular to the light propagation direction and has a refractive index different from the refractive index of the region shown by diagonal lines. The region with a small width is held between the convex regions 13 and 14, has a refractive index equal to the refractive index of the region with a large width, and connects the regions with a large width adjacent thereto.

The refractive index of the refractive index difference region 12 may be higher or lower than the refractive index of the portion shown by diagonal lines. The region having a high refractive index and the region having a low refractive index are alternately arranged in the direction substantially perpendicular to the light propagation direction, whereby each phase grating GP1 can be easily formed.

Figure 10B:
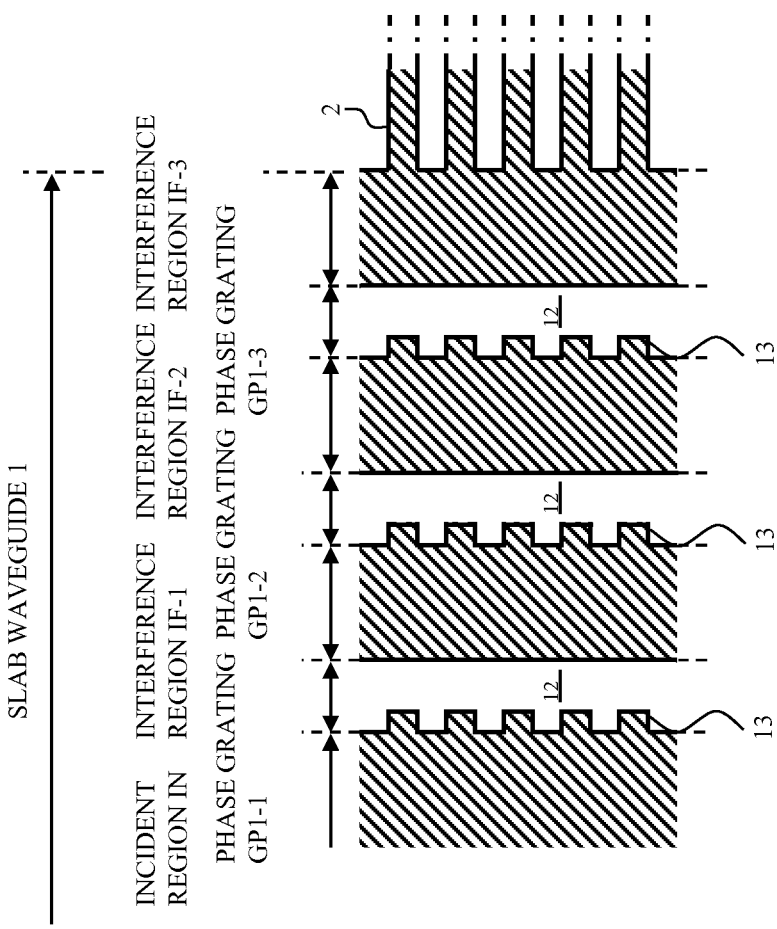
Figure 11A:
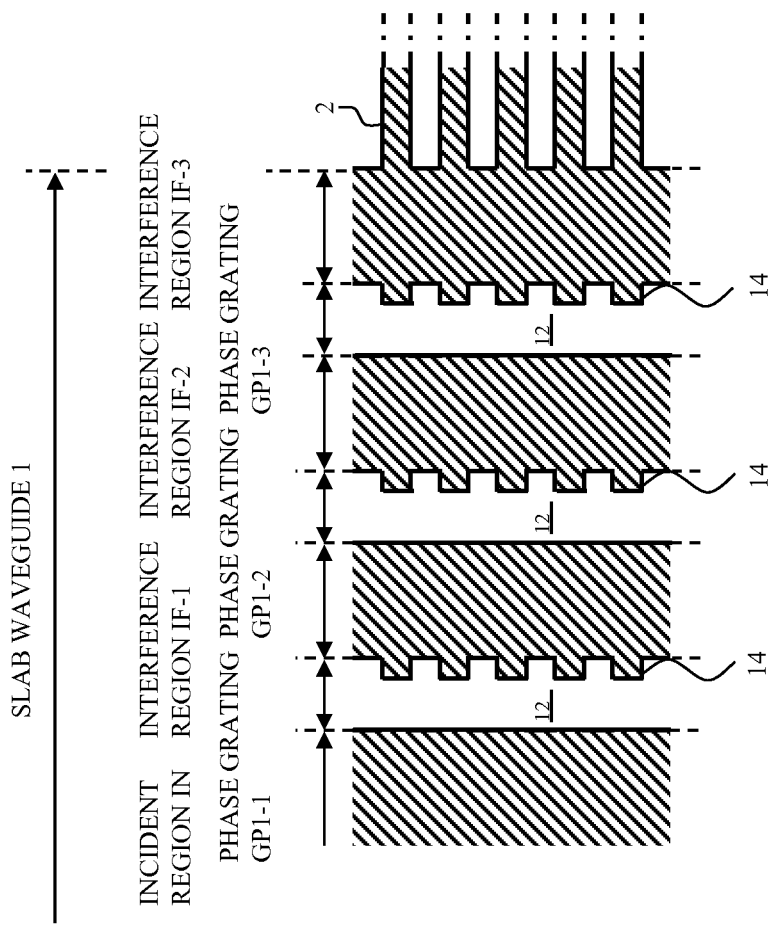
FIGS. 11A and 11B are views showing a structure of an optical waveguide.

Although the convex regions 13 and 14 are arranged in the optical waveguide shown in FIG. 10A, only the convex region 13 may be disposed as in the optical waveguide shown in FIG. 10B, and only the convex region 14 may be disposed as in the optical waveguide shown in FIG. 11A. In the optical waveguide shown in FIG. 1 OA, the sum of the light propagation direction widths of the convex regions 13 and 14 of all the phase gratings GP1 is set to L1 shown in FIG. 5. In the optical waveguide shown in FIG. 10B, the sum of the light propagation direction widths of the convex regions 13 of all the phase gratings GP1 is set to L1 shown in FIG. 5. In the optical waveguide shown in FIG. 11A, the sum of the light propagation direction widths of the convex regions 14 of all the phase gratings GP1 is set to L1 shown in FIG. 5. In the optical waveguides shown in FIGS. 10A, 10B, and 11A, although the convex regions 13 and 14 have a rectangular shape, they may have any shape.

In the optical waveguide shown in FIGS. 10A and 10B, a concave region between the convex regions 13 adjacent thereto in the direction substantially perpendicular to the light propagation direction may have any shape. In the optical waveguide shown in FIGS. 10A and 11A, a concave region between the convex regions 14 adjacent thereto in the direction substantially perpendicular to the light propagation direction may have any shape. Moreover, a boundary surface of the incident region IN or the interference region IF may have any shape.

Figure 12A:
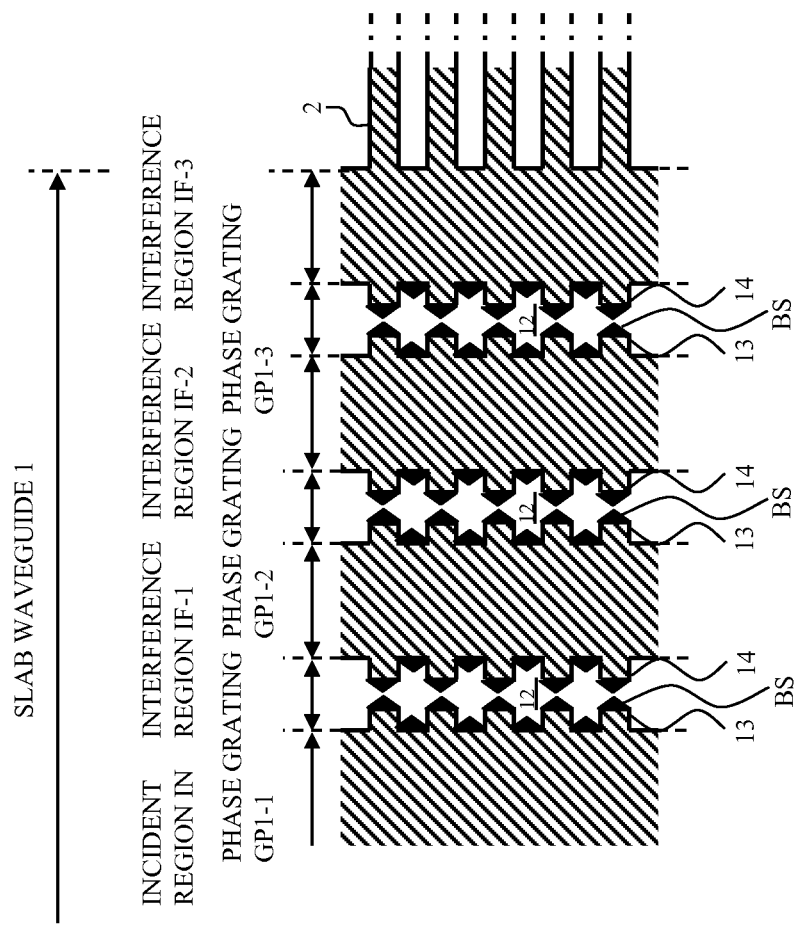
FIGS. 12A and 12B are views showing a structure of an optical waveguide.

As a variation of the optical waveguide shown in FIG. 10A, as in the optical waveguide shown in FIG. 12A, a boundary surface region BS may be formed on a boundary surface between the convex region 13 and the refractive index difference region 12, on a boundary surface between the convex region 14 and the refractive index difference region 12, and on a boundary surface between the concave region and the refractive index difference region 12. The boundary surface region BS shown in FIG. 12A has the same refractive index as the refractive index of a core material constituting the interference region IF or a refractive index between the refractive index of the core material constituting the interference region IF and the refractive index of the clad material constituting the refractive index difference region 12.

Figure 12B:
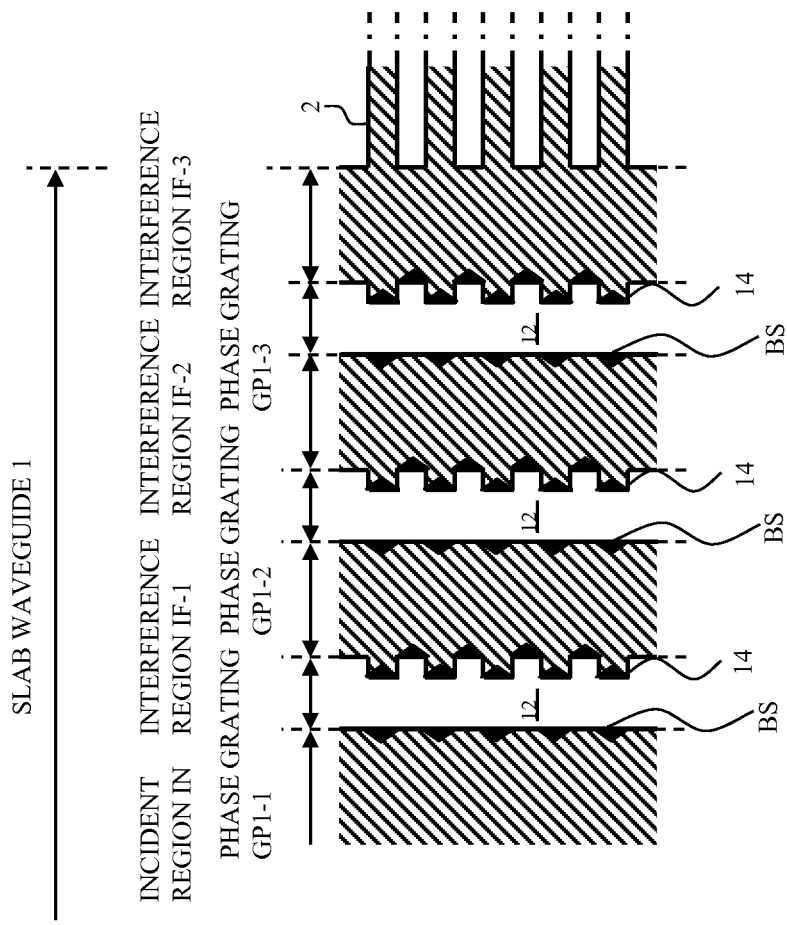

As a variation of the optical waveguide shown in FIG. 11A, as in the optical waveguide shown in FIG. 12B, the boundary surface region BS may be formed on a boundary surface between the convex region 14 and the refractive index difference region 12, on a boundary surface between the incident region IN or the interference region IF and the refractive index difference region 12, and on a boundary surface between the concave region and the refractive index difference region 12. The boundary surface region BS shown in FIG. 12B has the same refractive index as the refractive index of the clad material constituting the refractive index difference region 12 or a refractive index between the refractive index of the core material constituting the interference region IF and the refractive index of the clad material constituting the refractive index difference region 12.

As in the optical waveguide shown in FIGS. 12A and 12B, the boundary surface region BS whose surface extends in a direction different from directions substantially parallel and perpendicular to the light propagation direction is formed on a boundary surface between regions having different refractive indices, whereby light reflection can be suppressed, and it is also possible to prevent light from being reflected toward an input/output waveguide connected to the end of the slab waveguide. In the optical waveguides shown in FIGS. 12A and 12B, although one kind of material is used as a material of the boundary surface region BS, a plurality of kinds of materials may be used in combination.

Figure 11B:
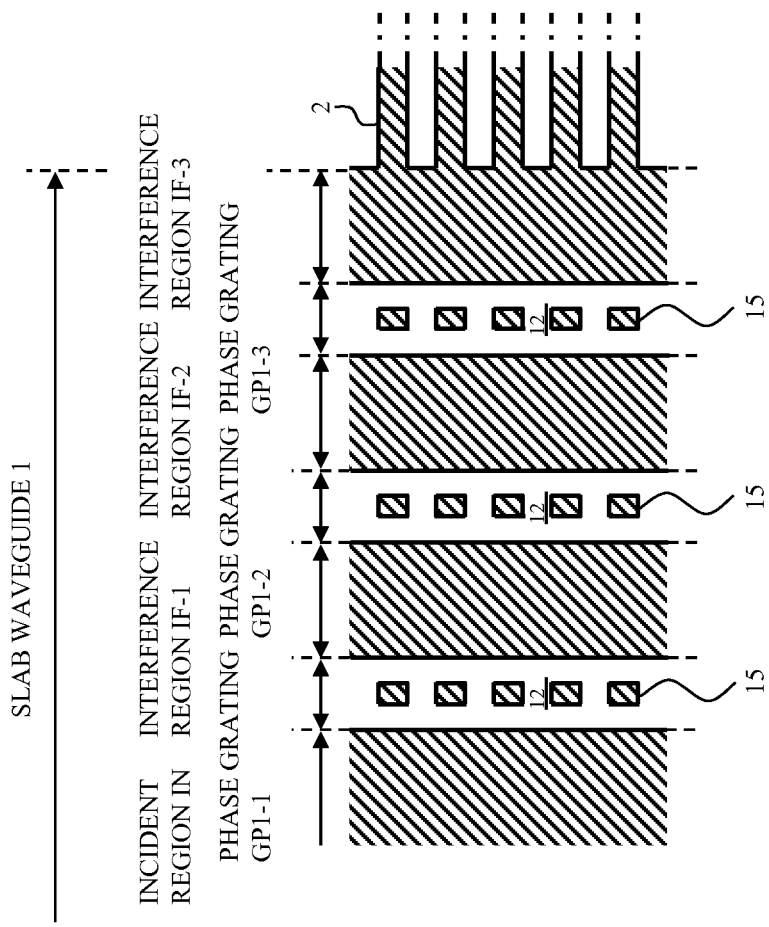

Each phase grating GP1 shown in FIG. 11B is provided with the refractive index difference region 12 and an island-shaped region 15. The refractive index difference region 12 is provided with a region having a large width and a region having a small width in the direction substantially perpendicular to the light propagation direction and is integrated across the entirety of each phase grating GP 1. The regions with a large width are arranged in the slab waveguide 1 at a distance in the direction substantially perpendicular to the light propagation direction and have a refractive index different from the refractive index of the region shown by diagonal lines. The region with a small width is held between the region shown by diagonal lines and the island-shaped region 15, has a refractive index equal to the refractive index of the region with a large width, and connects the regions with a large width adjacent thereto.

The refractive index of the refractive index difference region 12 may be higher or lower than the refractive index of the portion shown by diagonal lines. The region having a high refractive index and the region having a low refractive index are alternately arranged in the direction substantially perpendicular to the light propagation direction, whereby each phase grating GP1 can be easily formed.

In the optical waveguide shown in FIG. 11B, the sum of the light propagation direction widths of the island-shaped regions 15 of all the phase gratings GP1 is set to L1 shown in FIG. 5. In the optical waveguide shown in FIG. 11B, although the island-shaped region 15 has a rectangular shape, the island-shaped region 15 may have any shape. Also in the optical waveguide shown in FIG. 11B, as in the optical waveguide shown in FIGS. 12A and 12B, the boundary surface region BS may be formed on a boundary surface between regions having different refractive indices.

Figure 13A:
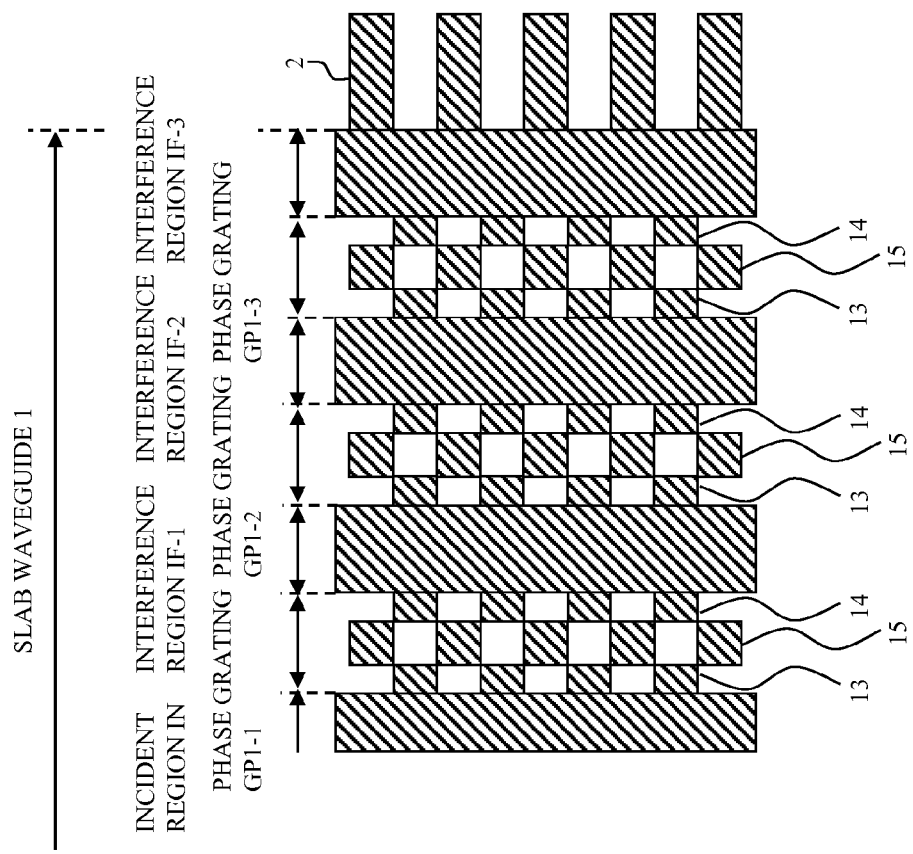
FIGS. 13A and 13B are views showing a structure of an optical waveguide.
Figure 13B:
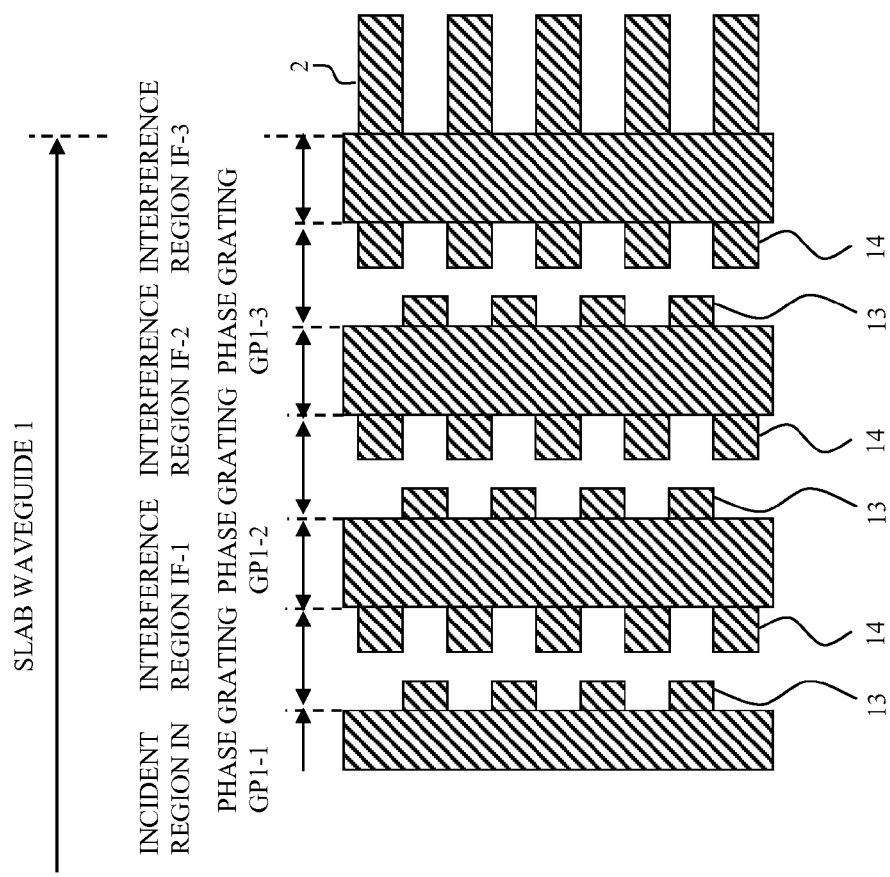

In the optical waveguide shown in FIGS. 10 and 11, although the convex regions 13 and 14 or the island-shaped region 15 are formed on an extension line of the arrayed waveguide 2, the convex regions 13 and 14 or the island-shaped region 15 may be formed on an extension line between the arrayed waveguides 2 adjacent to each other in the direction substantially perpendicular to the light propagation direction. As in the optical waveguide shown in FIG. 13, as long as the convex regions 13 and 14 or the island-shaped region 15 can give a phase difference to light, the convex regions 13 and 14 or the island-shaped region 15 may be formed on both the extension line of the arrayed waveguide 2 and the extension line between the arrayed waveguides 2 adjacent to each other in the direction substantially perpendicular to the light propagation direction. In the optical waveguide shown in FIG. 13A, the convex regions 13 and 14 are formed on the extension line of the arrayed waveguide 2 adjacent to each other in the direction substantially perpendicular to the light propagation direction, and the island-shaped region 15 is formed on the extension line between the arrayed waveguides 2. In the optical waveguide shown in FIG. 13B, the convex region 13 is formed on the extension line of the arrayed waveguide 2 adjacent to each other in the direction substantially perpendicular to the light propagation direction, and the convex region 14 is formed on the extension line between the arrayed waveguides 2.

Embodiment 4

In the embodiment 4, an arrayed waveguide grating provided with the optical waveguide described in the embodiments 1 to 3 will be described. In the arrayed waveguide grating, one or more first input/output waveguides, a first slab waveguide, a plurality of arrayed waveguides, a second slab waveguide, and one or more second input/output waveguides are connected in this order. The first slab waveguide and the plurality of arrayed waveguides constitute the optical waveguide described in the embodiments 1 to 3, serving as a slab waveguide 1 and an arrayed waveguide 2, respectively.

Although light with a plurality of wavelengths propagates in the first slab waveguide, an arbitrary wavelength of the wavelengths is selected as X in FIGS. 1 and 2. The arbitrary wavelength is a center wavelength in the plurality of the wavelengths, for example. When the arbitrary wavelength is applied, the designing method described in the embodiment 2, and the manufacturing method described in embodiment 3, are applied.

The grating may be disposed in not only the first slab waveguide but also the second slab waveguide. The grating may be disposed in only the first slab waveguide, and the transition region of the Patent Documents 1 to 4 or the slope portion of the Patent Document 5 may be disposed in the second slab waveguide.

INDUSTRIAL APPLICABILITY

An optical waveguide and an arrayed waveguide grating according to the present disclosure can be utilized in low loss optical fiber communication utilizing wavelength division multiplexing system.

EXPLANATION OF REFERENCE SIGNS

1: Slab waveguide
2: Arrayed waveguide
11: Refractive index difference region
12: Refractive index difference region
13: Convex region
14: Convex region
15: Island-shaped region
GP: Phase grating
SP: Self-image
IN: Incident region
IF: Interference region
BS: Boundary surface region

The invention claimed is:

1. An optical waveguide comprising:
a slab waveguide which has a plurality of phase gratings arranged at a distance from each other in a direction substantially parallel to a light propagation direction and diffracting propagated light, and a plurality of interference regions arranged alternately to the plurality of phase gratings in the direction substantially parallel to the light propagation direction, the light diffracted by the plurality of phase gratings interfering in the interference regions; and
an arrayed waveguide having an end connected to an end of the slab waveguide at a position of a constructive interference portion of a self-image formed by the plurality of phase gratings as an integrated phase grating,
wherein the plurality of phase gratings comprises refractive index difference regions arranged in the slab waveguide at a distance from each other in a direction substantially perpendicular to the light propagation direction and having a refractive index lower than the refractive indices of the plurality of interference regions.

2. The optical waveguide according to claim 1, wherein a phase difference given to incident light by the integrated phase grating is approximately 90 degrees.

3. The optical waveguide according to claim 1, wherein a phase difference given to incident light by the integrated phase grating is approximately 180 degrees.

4. The optical waveguide according to claim 1, wherein the refractive index difference regions adjacent to each other in the direction substantially perpendicular to the light propagation direction are connected by a region having a refractive index equal to the refractive index of the refractive index difference region, and the refractive index difference regions are integrated with each other across the entirety of each phase grating.

5. An arrayed waveguide grating comprising:
one or more first input/output waveguides;
the optical waveguide according to claim 1 having an end of the slab waveguide on the opposite side of the arrayed waveguide is connected to an end of the first input/output waveguide;
a second slab waveguide connected to an end of the arrayed waveguide on the opposite side of the slab waveguide; and
one or more second input/output waveguides connected to an end of the second slab waveguide on the opposite side of the arrayed waveguide.

6. The optical waveguide according to claim 2, wherein the refractive index difference regions adjacent to each other in the direction substantially a perpendicular to the light propagation direction are connected by a region having refractive index equal to the refractive index of the refractive index difference region, and the refractive index difference regions are integrated with each other across the entirety of each phase grating.

7. An arrayed waveguide grating comprising:
one or more first input/output waveguides;
the optical waveguide according to claim 6 having an end of the slab waveguide on the opposite side of the arrayed waveguide is connected to an end of the first input/output waveguide;
a second slab waveguide connected to an end of the arrayed waveguide on the opposite side of the slab waveguide; and one or more second input/output waveguides connected to an end of the second slab waveguide on the opposite side of the arrayed waveguide.

8. An arrayed waveguide grating comprising:
one or more first input/output waveguides;
the optical waveguide according to claim 2 having an end of the slab waveguide on the opposite side of the arrayed waveguide connected to an end of the first input/output waveguide;
a second slab waveguide connected to an end of the arrayed waveguide on the opposite side of the slab waveguide; and
one or more second input/output waveguides connected to an end of the second slab waveguide on the opposite side of the arrayed waveguide.

9. The optical waveguide according to claim 3, wherein the refractive index difference regions adjacent to each other in the direction substantially perpendicular to the light propagation direction are connected by a region having a refractive index equal to the refractive index of the refractive index difference region, and the refractive index difference regions are integrated with each other across the entirety of each phase grating.

10. An arrayed waveguide grating comprising:
one or more first input/output waveguides;
the optical waveguide according to claim 9 having an end of the slab waveguide on the opposite side of the arrayed waveguide connected to an end of the first input/output waveguide;
a second slab waveguide connected to an end of the arrayed waveguide on the opposite side of the slab waveguide; and
one or more second input/output waveguides connected to an end of the second slab waveguide on the opposite side of the arrayed waveguide.

11. An arrayed waveguide grating comprising:
one or more first input/output waveguides;
the optical waveguide according to claim 3 having an end of the slab waveguide on the opposite side of the arrayed waveguide is connected to an end of the first input/output waveguide;
a second slab waveguide connected to an end of the arrayed waveguide on the opposite side of the slab waveguide; and
one or more second input/output waveguides connected to an end of the second slab waveguide on the opposite side of the arrayed waveguide.

12. An arrayed waveguide grating comprising:
one or more first input/output waveguides;
the optical waveguide according to claim 4 having an end of the slab waveguide on the opposite side of the arrayed waveguide is connected to an end of the first input/output waveguide;
a second slab waveguide connected to an end of the arrayed waveguide on the opposite side of the slab waveguide; and
one or more second input/output waveguides connected to an end of the second slab waveguide on the opposite side of the arrayed waveguide.

\* \* \* \* \*